US006799284B1

(12) United States Patent
Patel et al.

(10) Patent No.: US 6,799,284 B1
(45) Date of Patent: Sep. 28, 2004

(54) REPARITY BITMAP RAID FAILURE RECOVERY

(75) Inventors: Kayuri Patel, Cupertino, CA (US); Raymond Chen, Campbell, CA (US); Rajesh Sundaram, Mountain View, CA (US); Srinivasan Viswanathan, Fremont, CA (US); Andy Kahn, San Francisco, CA (US)

(73) Assignee: Network Appliance, Inc., Sunnyvale, CA (US)

(*) Notice: Subject to any disclaimer, the term of this patent is extended or adjusted under 35 U.S.C. 154(b) by 586 days.

(21) Appl. No.: 09/797,007

(22) Filed: Feb. 28, 2001

(51) Int. Cl.[7] .................................................. G06F 11/00
(52) U.S. Cl. .......................................... 714/6; 711/114
(58) Field of Search ........................ 714/6, 7; 711/114, 711/144

(56) References Cited

U.S. PATENT DOCUMENTS

| 5,195,100 A | 3/1993 | Katz et al. |
|---|---|---|
| 5,208,813 A | 5/1993 | Stallmo |
| 5,222,217 A | 6/1993 | Blount et al. |
| 5,235,601 A | 8/1993 | Stallmo et al. |
| 5,255,270 A | 10/1993 | Yanai et al. |
| 5,274,799 A | 12/1993 | Brant et al. |
| 5,274,807 A | 12/1993 | Hoshen et al. |
| 5,315,602 A | 5/1994 | Noya et al. |
| 5,379,417 A | 1/1995 | Lui et al. |
| 5,490,248 A | 2/1996 | Dan et al. |
| 5,502,836 A | 3/1996 | Hale et al. |
| 5,737,744 A | 4/1998 | Callison et al. |
| 5,948,110 A | 9/1999 | Hitz et al. |
| 5,950,225 A | 9/1999 | Kleiman |
| 6,073,089 A | 6/2000 | Baker et al. |
| 6,148,368 A | * 11/2000 | DeKoning .................. 711/113 |
| 6,161,165 A | * 12/2000 | Solomon et al. ............ 711/114 |
| 6,233,648 B1 | * 5/2001 | Tomita .......................... 711/4 |
| 6,327,638 B1 | * 12/2001 | Kirby .............................. 711/4 |
| 6,480,969 B1 | * 11/2002 | Hitz et al. ....................... 714/6 |
| 2001/0002480 A1 | * 5/2001 | Dekoning et al. .......... 711/130 |
| 2002/0035666 A1 | * 3/2002 | Beardsley et al. .......... 711/114 |

FOREIGN PATENT DOCUMENTS

| EP | 0 462 917 A3 | 12/1991 |
|---|---|---|
| EP | 0 462 917 B1 | 12/1991 |
| EP | 0 462 917 A2 | 12/1991 |
| EP | 0 492 808 A2 | 7/1992 |
| EP | 0 492 808 A3 | 7/1992 |
| EP | 0 492 808 B1 | 7/1992 |
| EP | 1 031 928 A3 | 8/2000 |
| EP | 1 031 928 A2 | 8/2000 |
| WO | WO 94/29795 A1 | 12/1994 |
| WO | WO 99/45456 A1 | 9/1999 |

OTHER PUBLICATIONS

Yamamoto Akira; Disk Array Controller; EPPatent Abstract of Japan; vol. vol. 17; No. 621;p. 1.
Specification: Fly–By–Xor.

(List continued on next page.)

*Primary Examiner*—Scott Baderman
(74) *Attorney, Agent, or Firm*—Swernofsky Law Group PC

(57) ABSTRACT

The invention provides a method and system for reducing RAID parity computation following a RAID subsystem failure. Ranges of RAID stripes are assigned to bits in a bitmap that is stored on disk. When writes to the RAID are in progress, the bit associated with the range of stripes in the bitmap is set. When a failure occurs during the write process, the bitmap is analyzed on reboot to determine which ranges of stripes where in the process of being written, and the parity data for only those ranges of stripes is recomputed. Efficiency is increased by use of an in-memory write counter that tracks multiple writes to each stripe range. Using the write counter, the bitmap is written to disk only after each cycle of its associated bitmap bit being set to a value of 1 and then returning to zero. The invention may be installed, modified, and removed at will from a RAID array, and this may be accomplished while the system is in operation.

44 Claims, 4 Drawing Sheets

Reparity Bitmap Correlation to RAID Stripes and Write Counters

OTHER PUBLICATIONS

Gray, Jim et al.; Parity Striping of Disc Arrays: Low–Cost Reliable Storage with Acceptable Throughput; Tandem Computers Inc., 1993 Vallco Parkway, Cupertino, California. XP 000522459.

Jai Menon and Jim Cortney; The Architecture of a Fault–Tolerant Cached RAID Controller; IBM Almaden Research Center; San Jose, California. Technical Disclosure Bulletin; vol. 36 No. 3; 1993 XP 000398988.

Patterson et al.; A Case For Redundant Arrays of Inexpensive Disks (RAID); Computer Science Division Dept. of Electrical Engineering and Computer Sciences; 571 Evans Hall; University of California, Berkeley.

Slashdot: Tux2: The Filesystem That Would Be King—Mircrosoft Internet Explorer. Oct. 20, 2000.

IBM Technical Disclosure Bulletin. vol. 36. No. 3 Mar. 1993. Parity Preservation for Redundant Array of Independent Direct Access Storage Device Data Loss Minimization and Repair. XP000354845.

* cited by examiner

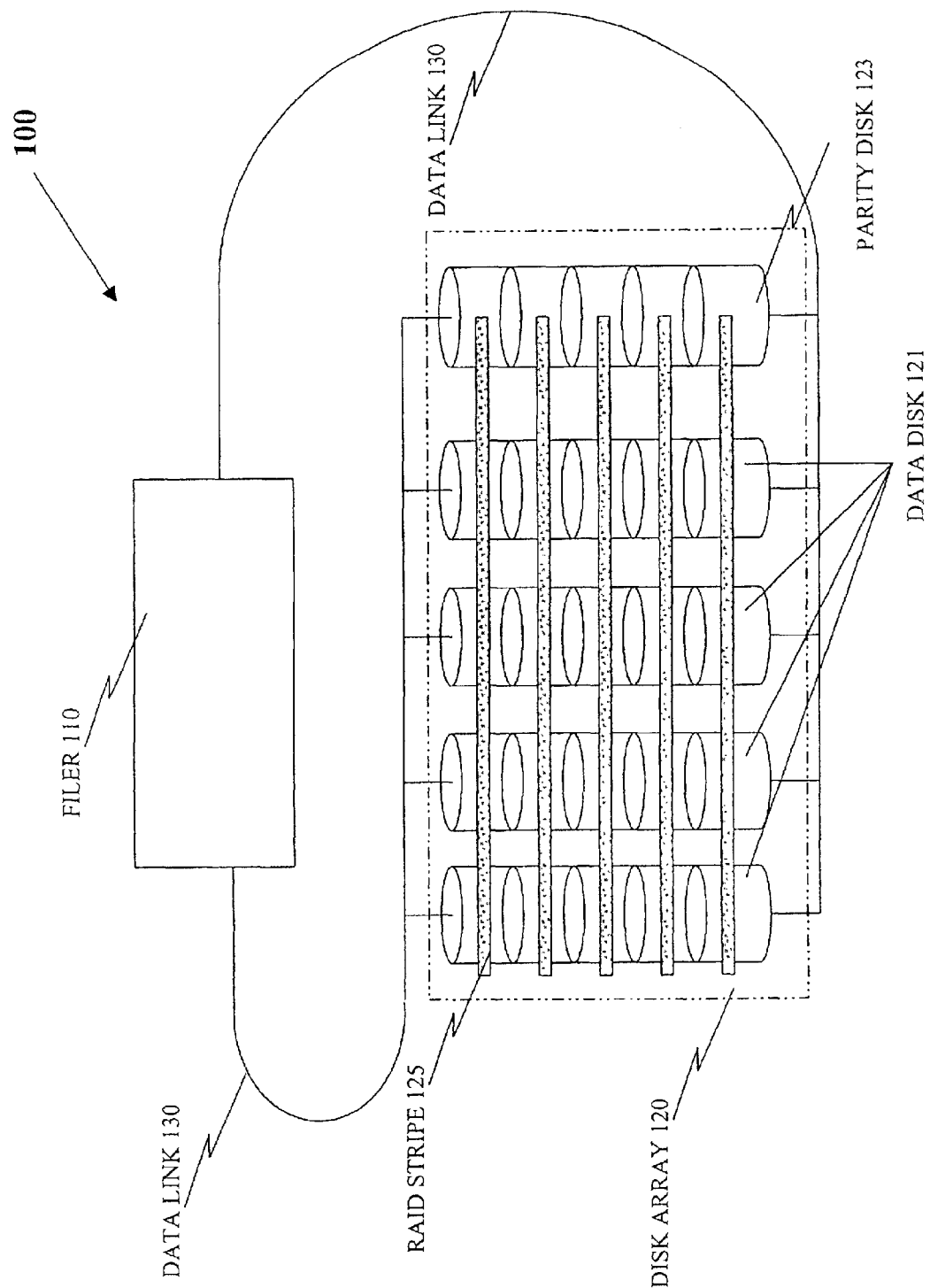
Fig. 1/4

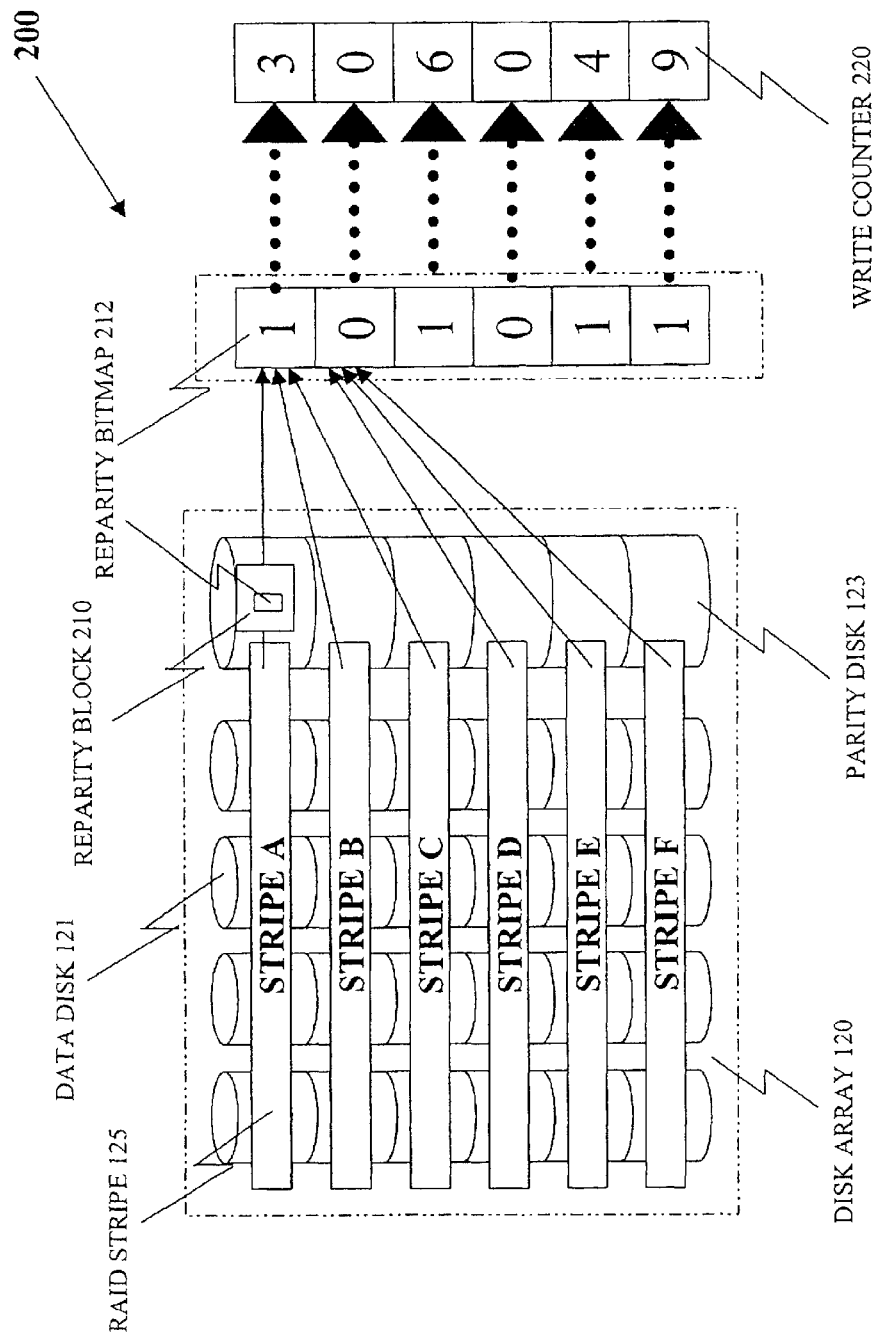
Fig. 2/4

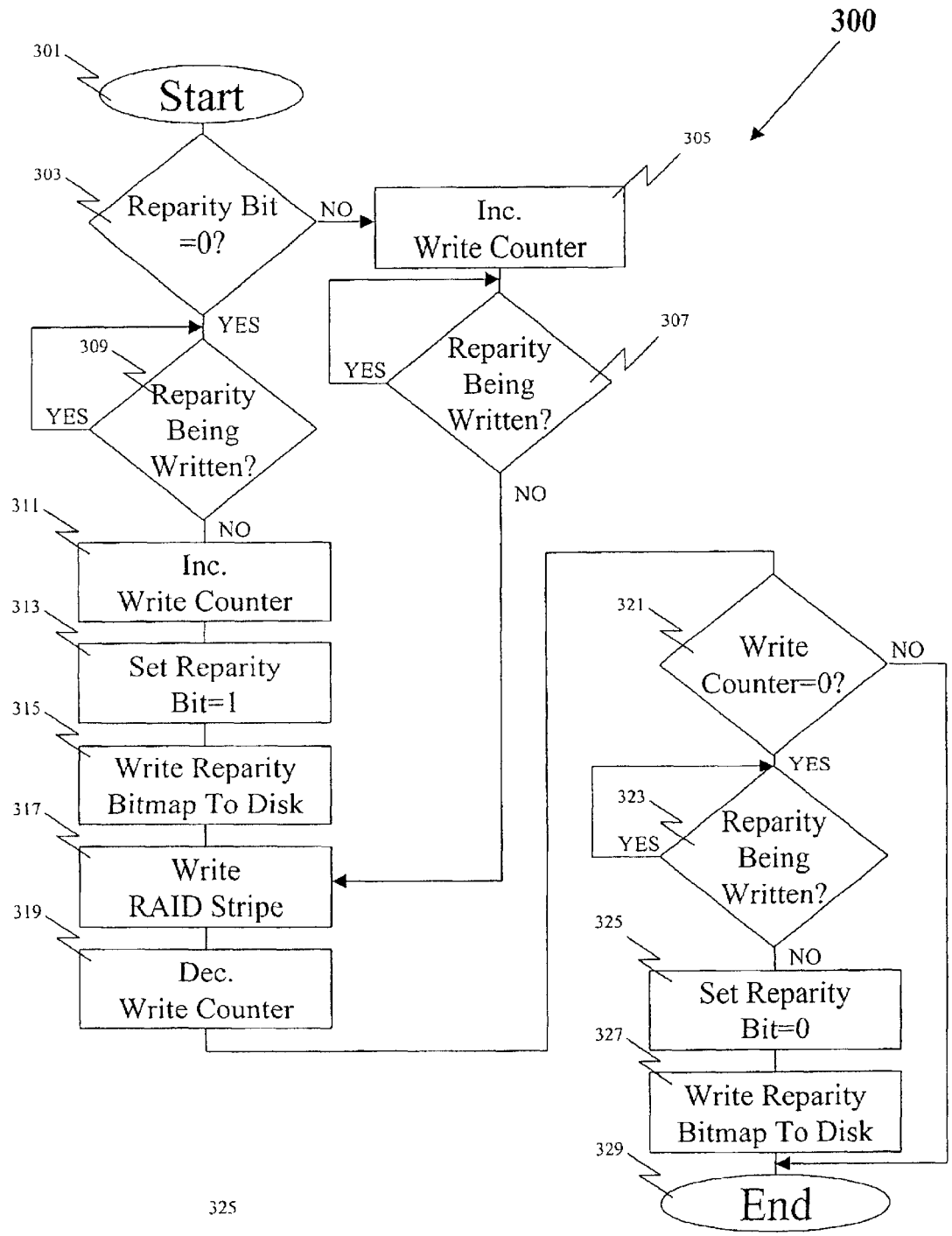
Fig. 3/4

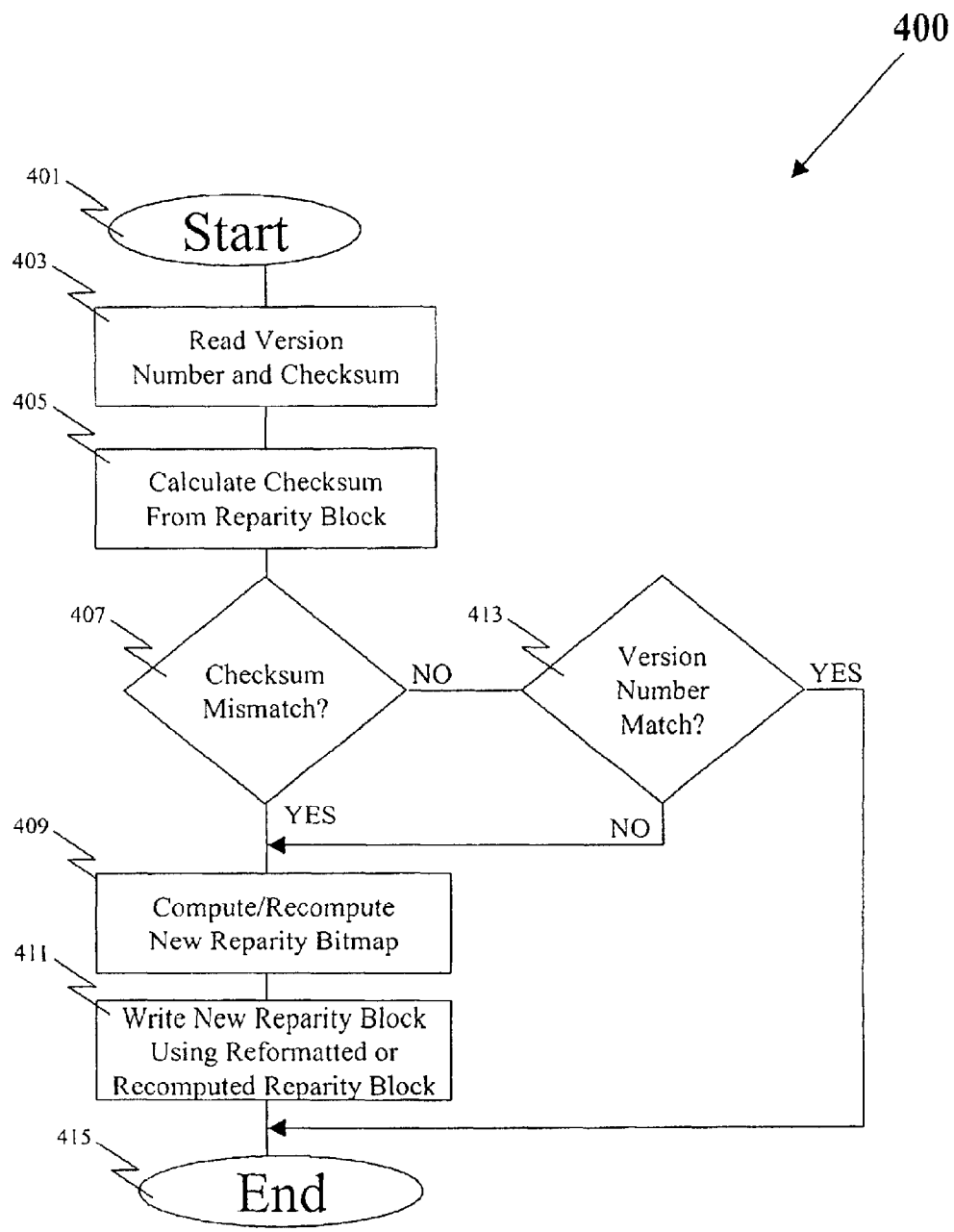
Fig. 4/4

REPARITY BITMAP RAID FAILURE RECOVERY

BACKGROUND OF THE INVENTION

1. Field of the Invention

This invention relates to recovery of parity data on electronic data mass storage systems known as RAID (Redundant Array of Independent Disks).

2. Related Art

RAID is a popular and well-known method used for storage and retrieval of data. It offers a data source that can be made readily available to multiple users with a high degree of data security and reliability.

In general, RAID is available in several configurations known as levels. Each of these levels offers at least one performance enhancement over a single drive (e.g. data mirroring, faster reads, data recovery). A popular feature of RAID, and probably the justification for its use in so many systems, is the ability to reconstruct lost data from parity information that is recorded along with the other data. Committing such large amounts of data to a RAID places a lot of trust in the RAID concept that data will be recoverable using the parity data in the event a failure occurs.

Problems can arise when a failure does occur and both the parity data and the other stored data are damaged. Without the parity information, it is impossible to recompute missing data.

A first known method used to combat this weakness is to log RAID stripes as they are written. In the event a crash occurs, the log can be used to determine which blocks should have their associated redundancy information recomputed. Variants of this technique include: logging the actual data, logging time-stamps and block numbers of blocks written, and logging stripe numbers and parity information to non-volatile memory.

Logs reduce the amount of parity information that has to be reconstructed on the RAID, which in turn reduces the amount of time that the array contains unprotected data. While the use of logs can combat some of the weakness in RAID implementation, it can require excessive overhead to maintain which in turn reduces data transfer rates. Additionally, data can be lost when logs are compromised.

A second known method is to "stage" the data and parity information to a pre-write area. Following a crash, the system can copy the data/parity information from the pre-write area to the RAID array. Use of a pre-write area requires data to be written twice; once to the pre-write area and then again to the actual stripe(s) in the array. This provides a more secure write transaction at the cost of reducing data transfer speed.

Accordingly, it would be desirable to provide a technique for enabling RAID failure recovery without the severe drawbacks of the known art.

SUMMARY OF THE INVENTION

The invention provides a method and system for RAID failure recovery due to a system crash that can function independently or as a supplemental and redundant recovery method to other RAID recovery strategies. A reparity bitmap is created with each bit representing N stripes within the RAID. When a write occurs to a stripe, the associated reparity bit is set to 1; otherwise the bit is set to its default value of zero.

Each bit in the reparity bitmap has an associated in-memory write counter. The write counter is used to track the number of writes in progress to a stripe range. Upon initiation of the first write to a stripe range, the reparity bit for the stripe range is set, and the write counter is incremented from its default value to indicate that one write is in progress. Subsequent, concurrent writes, cause the write counter to be incremented.

Upon completion of a write to the stripe range, the write counter is decremented. When all writes to the stripe range have been completed, the write counter will have returned to its default value, the reparity bit is cleared, and the reparity bitmap is written to disk. Using the write counter allows multiple writes to a stripe range without incurring two extra write I/Os (for the bitmap) per stripe write which greatly reduces overhead.

The writer first checks the reparity bitmap prior to executing a write. If the bit associated with that stripe is zero, the write counter is incremented for that reparity bitmap bit and the reparity bit is set to 1. The writer can proceed with the stripe write once the reparity bitmap is written to disk.

In the event the reparity bit is already set to 1, the writer increments the write counter and checks to see if the reparity bitmap is in the process of being written to disk. If the reparity bitmap is in the process of being written to disk, the writer waits for the reparity bitmap to be written and then writes the stripe; otherwise, the writer does not need to wait and writes the stripe without waiting.

If a system crash occurs, the reparity bitmap identifies those stripes that were in the process of being written—all other stripes are assured to be consistent. On reboot, the reparity bitmap is read by the RAID system and, if needed, recomputation of the data using parity information occurs on only those stripes whose associated reparity bit is set.

This summary has been provided so that the nature of the invention may be understood quickly. A more complete understanding may be obtained by reference to the following description of the preferred embodiments in combination with the attached drawings.

BRIEF DESCRIPTION OF THE DRAWINGS

FIG. 1 shows a block diagram of a system for reparity bitmap RAID failure recovery.

FIG. 2 shows a block diagram of reparity bitmap correlation to RAID stripes and write counters for a system for reparity bitmap RAID failure recovery.

FIG. 3 illustrates a process flow diagram of a method for reparity bitmap RAID failure recovery.

FIG. 4 illustrates a reparity bitmap generation process flow diagram of a method for reparity bitmap RAID failure recovery.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

Lexicography

The following terms refer or relate to aspects of the invention as described below. The descriptions of general meanings of these terms are not intended to be limiting, only illustrative.

RAID—in general, short for Redundant Array of Independent (or Inexpensive) Disks, a category of disk drives that employ two or more drives in combination for fault tolerance and performance.

RAID stripe—in general, a set of data, often including parity information, saved across two or more hard disk drives that comprise a RAID subsystem.

Parity recomputation—in general, the function of recomputing parity information for a RAID stripe from the data present in the stripe.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

FIG. 1 shows a block diagram of a system for reparity bitmap RAID failure recovery.

A system 100 includes a filer 110 (file server dedicated to the storage and retrieval of electronic data), a disk array 120, and a data link 130.

A filer 110 includes a processor, a main memory, and software for executing instructions (not shown, but understood by one skilled in the art). This software preferably includes software for managing a RAID storage system according to the invention. Although the filer 110 and the disk array 120 are shown as separate devices, there is no requirement that they be physically separate.

In a RAID configuration, the disk array 120 includes two or more data disks 121 and a parity disk 123. A RAID stripe 125 includes data written to the data disk 121 and parity data written to the parity disk 123. The parity disk 123 includes parity information related to each RAID stripe 125. RAID level 4 is used in a preferred embodiment; however, there is no requirement that RAID level 4 be used, and other levels of RAID may also be used. RAID level configurations are well-known in the art.

A data link 130 operates to couple the filer 110 to the disk array 120.

In a preferred embodiment, the data link 130 includes a direct wired connection. In alternative embodiments, the data link 130 may include alternative forms of communication, such as the Internet, an intranet, extranet, virtual private network, wireless network, or some combination thereof.

Method of Operation

FIG. 2 shows a block diagram of reparity bitmap correlation to RAID stripes and write counters for a system for reparity bitmap RAID failure recovery.

The reparity block 210 includes the reparity bitmap 212 and header information (not shown). The header information includes a version number, checksum, the number of stripes tracked per bit (described in further detail below), and the number of bits in the reparity bitmap 212.

The reparity bitmap 212 includes electronic data collectively configured as a bitmap. Each bit within the reparity bitmap 212 is mapped to a range of RAID stripes 125. In a preferred embodiment, the reparity bitmap 212 is stored on the parity disk 123. However, there is no requirement that the reparity bitmap 212 be stored on the parity disk 123. In alternative embodiments, the reparity bitmap 212 may be stored on one or more of the plurality of data disks 121, in a non-volatile random access memory, some other form of memory or a combination thereof.

A single bit in the reparity bitmap 212 may be used to represent one or more than one RAID stripe 125. The reparity bitmap 212 may be regenerated at any time to allow any number of RAID stripes 125 to be associated with each bit without incurring downtime. The ability of each bit to represent more than one RAID stripe 125 is useful in situations where there is a restriction on the amount of space available to store the reparity bitmap 212. Thus, regenerating the reparity bitmap 212 may in some cases make the reparity bitmap 212 either larger or smaller.

The ability of the reparity bitmap 212 to be both increased or decreased in size enables several advantages. One of these advantages is scalability of the disk array 120. More and/or larger storage devices can be added to the disk array 120. The reparity bitmap 212 is simply adjusted to accommodate the disk array 120 attached to the system, and this may be accomplished while the system is in operation without system downtime. Another advantage is granularity. If it is desired to track RAID stripe activity in more detail, the reparity bitmap 212 can be altered to reduce the number of RAID stripes per reparity bit.

The reparity bitmap 212 is used to track when a write is in process to a range of RAID stripes 125. As stated, each bit in the reparity bitmap 212 is associated with a range of RAID stripes 125. When a write is occurring to a range of RAID stripes, the associated bit in the reparity bitmap 212 is set to a value of one. When no writes are occurring to the range of RAID stripes 125, the associated bit in the reparity bitmap 212 is set to zero.

Thus, if a bit in the reparity bitmap 212 is zero, the associated range of stripes 125 are assured to not have any writes in progress. As a result, those range of stripes 125 are assured to be consistent even if the system crashes.

The reparity bitmap 212 may be grown or shrunk to accommodate more RAID stripes 125 or less RAID stripes 125. For example, if the number of stripes in the disk array 120 grows to the point that the reparity bitmap 212 is too small to hold all the bits, the number of stripes per bit can be simply doubled, even during operation of the filesystem. This provides dynamic scalability, as previously mentioned. A new reparity bitmap 212 is generated along with a new set of write counters 220 based on the values of the existing reparity bitmap 212 and write counters 220. The reparity block 210 is then flushed to disk and stripe writes can continue as before.

In a preferred embodiment, the reparity bitmap 212 includes a header section recording a version number and a checksum, which are stored in the reparity block 210. When storage from a RAID array is moved from one filer to another, and the two filers use incompatible variants of the invention, it is detected by comparing the version numbers. Appropriate action can then be taken to ensure all storage operates using the same version of the invention.

Additionally, the version number can be useful when upgrading the RAID software to a new release of the software. The new release can determine the version of reparity bitmap 212 from the reparity block 210 and then modify the reparity bitmap 212, possibly by growing or shrinking the bitmap as necessary. This modification can occur without downtime.

For example, when RAID software is upgraded, that software preferably checks the version number of any reparity bitmaps 212 that it utilizes. The RAID software preferably can determine from this version number any difference between the configuration of the existing reparity bitmap 212 and the configuration that the software needs. The RAID software preferably can then reconfigure the reparity bitmap 212 accordingly.

In more detail, if a new release of the RAID software doubles a default number of RAID stripes 125 associated with each bit in the reparity bitmap 212, the RAID software can perform logical OR operations on pairs of bits from the old bitmap in order to derive bits for the new reparity bitmap 212. The new bitmap will be half the size of the old bitmap. Likewise, the write counters associated with the OR'd bits can be summed, thereby automatically keeping track of in-process writes for stripes associated with the bits in the new reparity bitmap 212. Once the new reparity bitmap 212 and write counters 220 are derived, the RAID software can replace the old bitmap with the new bitmap seamlessly and without downtime. Then, the software can update the reparity bitmap 212 version number.

The checksum can be used in the foregoing operations in order to help ensure that accidental corruption of the bitmap version number is not misinterpreted as an actual intended change in the version number.

The invention is capable of being installed on practically any RAID subsystem. Given an unused area of a RAID group to store the reparity bitmap 212, the invention is capable of upgrading a RAID group. The invention also offers the ability to erase its permanent data structures so a RAID previously implementing the invention can be used by a system that has not implemented the invention.

A write counter 220 includes a reserved memory address capable of storing a numeric value. In a preferred embodiment, there is one unique write counter 220 associated with each unique bit within the reparity bitmap 212. The write counter 220 is a memory resident structure that is only required for normal operation. When a crash occurs and other recovery strategies are unavailable (such as, non-volatile RAM), reconstruction of a stripe is dependent only on whether the bit is set for a range of stripes 125 in the reparity bitmap 212.

The purpose of the write counter 220 is to track the number of writes in progress to a range of RAID stripes 125. In a preferred embodiment, one write counter 220 is associated with each bit in the reparity bitmap 212, thus it tracks one range of RAID stripes 125. Each write counter 220 starts at a default value. The write counter 220 is incremented for each write in process to its associated range of RAID stripes 125 and decremented for each write that is completed.

In alternative embodiments of the invention, the write counter 220 may be decremented for each write that occurs concurrent with other writes to the same range of RAID stripes 125 and incremented for each write that is completed. The importance of the write counter is to track the cycle of a range of RAID stripes 125 being inactive, then active, and inactive once again and increase efficiency as previously explained.

Fewer writes of the reparity bitmap 212 to disk are necessary by using the write counter 220 in conjunction with the reparity bitmap 212. Multiple writes to a range of RAID stripes 125 can occur. Once the write counter 220 has returned to its default value, indicating no writes are currently occurring to the range of RAID stripes 125, the associated reparity bitmap 212 bit is set to zero and the reparity bitmap 212 is written.

In other words, a cycle occurs with reference to the write counter 220, reparity bitmap 212, and writes to the disk array 120 of the reparity bitmap 212 and RAID stripes 125. The write counter 220 is set at its default value and the bit in the reparity bitmap 212 is set to zero indicating the associated range of RAID stripes 125 are in a consistent state.

First, a bit in the reparity bitmap 212 is set to a value of one indicating at least one write to an associated range of RAID stripes 125 is in progress. The write counter is incremented. Second, additional writes to the range of RAID stripes 125 occur, and the write counter 220 reflects the total number of writes in progress.

Third, writes to the range of RAID stripes 125 begin to terminate as they are completed, and the write counter 220 reflects the decreasing number of writes to the range of RAID stripes 125. Fourth, the last write in process to the range of RAID stripes 125 is completed, which is indicated by the write counter returning to its default value. Fifth, the bit in the reparity bitmap 212 is set to zero completing the cycle. At this point, the RAID stripes 125 associated with the reparity bitmap 212 bit are assured to be consistent.

Normal Operation

FIG. 3 illustrates a process flow diagram of a method for reparity bitmap RAID failure recovery, indicated by general reference character 300. The reparity bitmap generation process 300 initiates at a 'start' terminal 301.

The reparity bitmap generation process 300 continues to a 'reparity bit=0?' decision procedure 303 which determines whether there are other writes occurring to the range of RAID stripes 125. If the 'reparity bit=0?' decision procedure 303 determines there are no other writes occurring to the range of RAID stripes 125 (i.e. reparity bit=0), the reparity bitmap generation process 300 continues to a 'reparity being written?' decision procedure 309. Otherwise, the reparity bitmap generation process 300 continues to an 'inc. write counter' procedure 305.

The 'inc. write counter' procedure 305 increments the value of the write counter 220 by a value of 1. The write counter 220 tracks multiple data writes to a stripe range so that writing the reparity bitmap 212 to disk for every stripe write can be avoided which in turn reduces overhead and increases efficiency.

A 'reparity being written?' decision procedure 307 determines whether the reparity bitmap 212 is in the process of being written to the parity disk 123. If the 'reparity being written?' decision procedure 307 determines that the reparity bitmap 212 is in the process of being written to the parity disk 123, then the reparity bitmap generation process 300 remains in the 'reparity being written?' decision procedure 307. The reparity bitmap generation process 300 continues to a 'write RAID stripe' procedure 317.

The 'reparity being written?' decision procedure 309 determines whether the reparity bitmap 212 is in the process of being written to parity disk 123. If the 'reparity being written?' decision procedure 309 determines that the reparity bitmap 212 is in the process of being written to disk, then the reparity bitmap generation process 300 remains in the 'reparity being written?' decision procedure 309. Otherwise, the reparity bitmap generation process 300 continues to an 'inc. write counter' procedure 311.

The 'inc. write counter' procedure 311 increments the value of the write counter 220 by a value of 1. A write counter 220 value greater than 1 indicates that multiple writes are in progress to the range of RAID stripes 125.

The 'set reparity bit=1' procedure 313 causes the reparity bit in the reparity bit map 212 to be set to a value of 1, indicating the range of RAID stripes 125 associated with the set bit is dirty (i.e. has been changed and has not been committed to disk).

A 'write reparity bitmap to disk' procedure 315 writes the reparity bitmap 212 to disk. If a system crash occurs after the reparity bitmap 212 has been committed to disk but before all or any of the range of RAID stripes 125 are committed to disk and the non-volatile RAM is corrupted, then the parity data can be computed using the reparity bitmap 212 to identify the dirty stripes. Only the dirty stripes identified by the reparity bitmap 212 need to be recomputed.

The 'write RAID stripe' procedure 317 causes the range of RAID stripes 125 to be written to the disk array 120.

The 'dec. write counter' procedure 319 causes the write counter 220 to be decremented indicating that one less write operation is in process for the range of RAID stripes 125 associated with the write counter 220 and bit in the reparity bitmap 212.

A 'write counter=0?' decision procedure 321 determines whether the write counter 220 has reached a value of zero. If the 'write counter=0?' decision procedure 321 determines that the write counter 220 for the range of RAID stripes 125 does not have a value of zero, then the reparity bitmap generation process 300 terminates through an 'end' terminal 329.

A 'reparity being written?' decision procedure 323 determines whether the reparity bitmap 212 is in the process of being written to disk. If the 'reparity being written?' decision procedure 323 determines that the reparity bitmap 212 is in the process of being written to disk, then the reparity bitmap generation process 300 continues to the 'reparity being written?' decision procedure 323.

A 'set reparity bitmap bit=0' procedure 325 causes the bit in the reparity bitmap 212 to be set to a value of zero. A bit set to 0 in the reparity bitmap 212 indicates that the associated range of RAID stripes 125 are in a consistent state.

A 'write reparity bitmap to disk' procedure 327 causes the reparity bitmap 212 to be written to disk.

The reparity bitmap generation process 300 terminates through the 'end' terminal 329.

Recovery Operation

Following a system failure and failure of other contingency strategies (e.g. nonvolatile RAM), parity recomputation occurs as is provided in conventional RAID systems. However, unlike conventional systems, recomputation need only occur on those RAID stripes 125 whose reparity bit is set.

Other system activities may occur concurrently with parity recomputation. However, disk failure involving a RAID stripe 125 that has not had its parity data recomputed most likely will result in data loss and a failure of the disk array 120. This loss of data can occur because the parity data required to recover from the failure has not been recomputed.

Bitmap Generation/Regeneration

Bitmap generation occurs when the invention is installed on a filer that is not already using the invention. Bitmap regeneration occurs when a filer is upgraded with a newer version of the invention, or when a filer is downgraded to an older version of the invention. Thus, a RAID subsystem may be freely moved from one filer to another.

FIG. 4 illustrates a reparity bitmap generation process flow diagram of a method for reparity bitmap RAID failure recovery, indicated by general reference character 400. The reparity bitmap generation process 400 initiates at a 'start' terminal 401.

The reparity bitmap generation process 400 continues to a 'read version number and checksum' procedure 403. This allows the version number and checksum of the reparity block 210 to be read from the parity disk 123 into memory.

A 'calculate checksum from reparity block' allows the checksum for the reparity block 210 to be calculated in memory. This is compared with the checksum stored in the reparity block 210.

A 'checksum mismatch?' decision procedure 407 determines if there is a checksum mismatch. If the 'checksum mismatch?' decision procedure 407 determines that there is not a checksum mismatch, then the reparity bitmap generation process 400 continues to a 'version number match' decision procedure 413. Otherwise, the reparity bitmap generation process 400 continues to a 'compute/recompute new reparity bitmap' procedure 409. The checksum in memory and the checksum stored on disk should be of the same value. If there is a checksum mismatch, then the reparity block 210 data is corrupted.

The 'compute/recompute new reparity bitmap' procedure 409 allows a new reparity bitmap 212 to be computed for the first time or recomputed when a version of the invention is already installed.

A 'write new reparity block using reformatted or recomputed reparity block' procedure 411 allows the newly created reparity block 210 to be written to disk. The reparity bitmap generation process 400 terminates through an 'end' terminal 415.

The 'version number match?' decision procedure 413 determines if the version number matches. If the 'version number match?' decision procedure 413 determines that the version number matches, the reparity bitmap regeneration process 400 terminates through an 'end' terminal 415. Otherwise the reparity bitmap generation process 400 continues to the 'compute/recompute new reparity bitmap' procedure 409.

Generality of the Invention

The invention has applicability and generality to other aspects of data storage on mass storage devices utilizing RAID; including filers, caches, databases, and other memory storage systems.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method for operating a filer, including
   initiating a write process;
   generating a bitmap, wherein said generating includes: (1) associating a bit within said bitmap with a set of RAID stripes in a RAID subsystem, and (2) recording a value for said bit indicative of the status of a write process to said set of RAID stripes; and
   recording to a write counter a value representative of the number of writes in progress to said set of RAID stripes, wherein the bitmap is only written to when the counter indicates all writes are complete.

2. The method of claim 1, further including
   recomputing, following a RAID failure, parity data for said set of RAID stripes if said bit is set to a value that indicates recomputing is necessary; and
   regenerating said bitmap, wherein said regenerating said bitmap includes: (1) associating a larger set of RAID stripes per said bit than previously used, (2) associating a smaller set of RAID stripes per bit than previously used, (3) increasing the size of said bitmap to accommodate more RAID stripes, or (4) shrinking said bitmap to accommodate fewer RAID stripes.

3. The method of claim 1, wherein said set of RAID stripes is a single RAID stripe.

4. The method of claim 1, wherein said set of RAID stripes is two or more RAID stripes.

5. The method of claim 1, wherein a value of zero for said bit indicates that no writes are in progress for said set of RAID stripes.

6. The method of claim 5, wherein said value of zero for said bit indicates that no recomputation of parity data is necessary for said set of RAID stripes associated with said bit following a failure of said RAID subsystem.

7. The method of claim 1, wherein a value of 1 for said bit indicates that at least one write is in progress for said set of RAID stripes.

8. The method of claim 7, wherein said value of 1 indicates that recomputing of parity data is necessary following a failure of said RAID subsystem.

9. The method of claim 1, wherein said bitmap is stored in an area of said RAID subsystem.

10. The method of claim 9, wherein said area is on at least one parity disk.

11. The method of claim 9, wherein said area is on at least one data disk.

12. The method of claim 2, wherein said recording of said value is to one of a plurality of write counter memories.

13. The method of claim 12, wherein each of said plurality of write counter(s) memories has a default value.

14. The method of claim 13, wherein one of said write counters is incremented responsive to a new write request to said set of RAID stripes.

15. The method of claim 14, wherein one of said write counters is decremented responsive to a write request being completed for said set of RAID stripes.

16. The method of claim 15, wherein one of said write counters returns to said default value from a value other than said default value.

17. The method of claim 2, wherein said recomputing is concurrent with other RAID subsystem operations.

18. The method of claim 1, wherein said set of RAID stripes is substantially contiguous within a set of disk blocks in a filesystem.

19. A method for operating a filer, including
initiating a write process; and
generating a bitmap, wherein said generating includes: (1) associating a bit within said bitmap with a set of RAID stripes in a RAID subsystem, and (2) recording a value for said bit indicative of the status of a write process to said set of RAID stripes, wherein said bitmap, a version number, and a checksum are elements of a reparity block and stored in an area of said RAID subsystem.

20. The method of claim 19, wherein a checksum value is calculated in memory for said reparity block and compared to said checksum value contained in said reparity block to test for a checksum mismatch.

21. The method of claim 20, wherein a mismatch does not occur indicating compatibility and that generation of a new bitmap is not necessary.

22. The method of claim 20, wherein a mismatch does occur indicating incompatibility and that generation of a new bitmap is necessary.

23. An apparatus including a memory and a processor, wherein said memory includes
an instruction for initiating a write process;
an instruction for generating a bitmap, wherein said generating includes: (1) associating a bit within said bitmap with a set of RAID stripes in a RAID subsystem, and (2) recording a value for said bit indicative of the status of a write process to said set of RAID stripes; and
an instruction for recording a value to a write counter, wherein said value is indicative of the number of writes in progress to said set of RAID stripes, wherein the bitmap is only written to when the counter indicates all writes are complete.

24. The apparatus of claim 23, wherein said memory further includes
an instruction for recomputing, following a RAID failure, parity data for said set of RAID stripes if said bit is set to a value indicating recomputing is necessary; and
an instruction for regenerating said bitmap, wherein said regenerating said bitmap includes: (1) associating a larger set of RAID stripes per said bit than previously used, or (2) associating a smaller set of RAID stripes per bit than previously used, or (3) increasing the size of said bitmap to accommodate more RAID stripes, or (4) shrinking said bitmap to accommodate fewer RAID stripes.

25. The apparatus of claim 23, wherein said set of RAID stripes is a single stripe.

26. The apparatus of claim 23, wherein said set of RAID stripes is two or more stripes.

27. The apparatus of claim 23, wherein a value of zero for said bit indicates that no writes are in progress for said set of RAID stripes.

28. The apparatus of claim 27, wherein said value of zero for said bit indicates that no recomputation of parity data is necessary for said set of RAID stripes associated with said bit following a failure of said RAID subsystem.

29. The apparatus of claim 23, wherein a value of 1 for said bit indicates that at least one write is in progress for said set of RAID stripes.

30. The apparatus of claim 29, wherein said value of 1 indicates that recomputing of parity data is necessary following a failure of said RAID subsystem.

31. The apparatus of claim 23, wherein said bitmap is stored in an area of said RAID subsystem.

32. The apparatus of claim 31, wherein said area is on at least one parity disk.

33. The apparatus of claim 31, wherein said area is on at least one data disk.

34. The apparatus of claim 24, wherein said recording of said value is to one of a plurality of write counter memories.

35. The apparatus of claim 34, wherein each of said plurality of write counter(s) memories has a default value.

36. The apparatus of claim 35, wherein one of said write counters is incremented responsive to a new write request to said set of RAID stripes.

37. The apparatus of claim 36, wherein one of said write counter is decremented responsive to a write request being completed for said set of RAID stripes.

38. The apparatus of claim 37, wherein one of said write counter returns to said default value from a value other than said default value.

39. The apparatus of claim 24, wherein said recomputing is concurrent with other RAID subsystem operations.

40. The apparatus of claim 23, wherein said set of RAID stripes is substantially contiguous within a set of disk blocks in a filesystem.

41. An apparatus including a memory and a processor, wherein said memory includes
an instruction for initiating a write process; and
an instruction for generating a bitmap, wherein said generating includes: (1) associating a bit within said bitmap with a set of RAID stripes in a RAID subsystem, and (2) recording a value for said bit indicative of the status of a write process to said set of RAID stripes, wherein said bitmap, a version number, and a checksum are elements of a reparity block and stored in an area of said RAID subsystem.

42. The apparatus of claim 41, wherein a checksum value is calculated in memory for said reparity block and compared to said checksum value contained in said reparity block to test for a checksum mismatch.

43. The apparatus of claim 42, wherein a mismatch does not occur indicating compatibility and that generation of a new bitmap is not necessary.

44. The apparatus of claim 42, wherein a mismatch does occur indicating incompatibility and that generation of a new bitmap is necessary.

* * * * *